Aug. 13, 1963
L. DEMAS
3,100,549
VEHICLE WHEEL SUSPENSION AND DRIVE
Filed Feb. 21, 1962
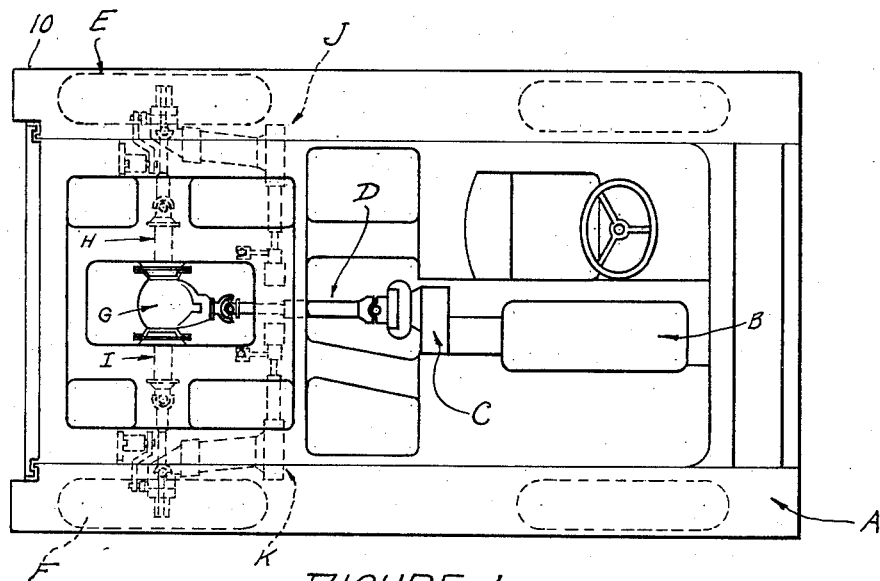
FIGURE 1
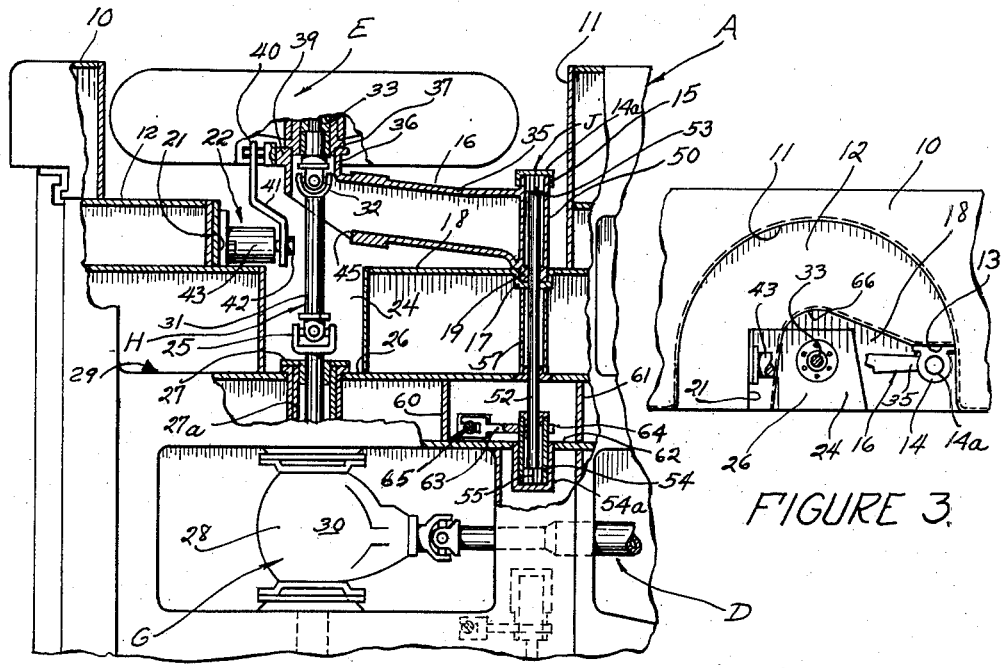
FIGURE 2.
FIGURE 3.
Louis Demas
INVENTOR.
BY *Carl J. Barbee*
ATTORNEY

United States Patent Office 3,100,549
Patented Aug. 13, 1963

3,100,549
VEHICLE WHEEL SUSPENSION AND DRIVE
Louis Demas, Oak Park, Mich., assignor to American Motors Corporation, Kenosha, Wis., a corporation of Maryland
Filed Feb. 21, 1962, Ser. No. 174,750
6 Claims. (Cl. 180—73)

The invention relates to apparatus for suspending a vehicle body relative to its wheels and for transmitting drive from the power unit to such wheels.

The invention has particular reference to a vehicle of the type capable of operating on land or on water. The invention thus contemplates a wheel suspension system for a vehicle of this type—such system having various refinements and improvements over prior art suspension systems.

The invention further contemplates suitable running gear for driving the rear wheels of a vehicle employing this particular type of suspension system.

A specific object of the invention is to provide a singular arm for carrying the wheel and a torsion bar type of spring associated with such arm. The construction of the arm is such as to accommodate the necessary running gear for imparting drive to the wheel.

A further specific object involves the construction details of mounting the arm and torsion bar relative to the vehicle body.

Other objects and advantages of the invention will be apparent from the ensuing specification and appended drawing in which:

FIGURE 1 is a plan view of an automotive vehicle employing the wheel suspension system and drive.

FIGURE 2 is an enlarged fragmentary view similar to FIGURE 1 showing a portion of the vehicle at one rear corner thereof with parts being shown in section.

FIGURE 3 is a fragmentary side elevational view showing the wheel pocket area with the wheel removed.

Referring to FIGURE 1, the vehicle shown includes a vehicle body A which may be constructed primarily of aluminum sheet material and forms a hull to permit the vehicle to float in water. An engine B is mounted near the forward end of the vehicle and a suitable transmission mechanism C transmits drive to the propeller shaft D which ultimately imparts drive to each of the rear wheels E and F. A differential mechanism G transmits the drive from shaft D to each of the axle shafts H and I which are drivingly connected to their respective wheels. Each of the rear wheels supports the rearward end of the vehicle body by means of resilient suspension mechanisms, identified generally by the letters J and K.

The suspension and drive system for each of the rear wheels may be of identical construction and hence further description will be largely confined to only one of such systems.

Thus, referring to FIGURES 2 and 3, the vehicle body is constructed to provide a wheel pocket area wherein the outside wall 10 is recessed at 11 to adequately accommodate the diameter of the rear wheel. The inner wall 12 is further recessed inwardly to provide a mounting surface 13 for the bracket 14 which is formed with a bearing portion 14a (hereafter referred to as the third bearing member) which rotatively carries the outer end or trunnion 15 of the control arm 16. A second bearing member 17 is anchored in the wall 18 for rotatably carrying the inner end or trunnion 19 of the control arm. The end wall 21 serves to mount the shock absorber mechanism identified generally by the numeral 22. The wall 18 is further recessed to provide the pocket area 24 which accommodates the universal joint 25 and provides the wall 26 for mounting the tubular member 27 which leads to the differential housing 28 and in effect serves as an extension of the differential housing. The tubular member 27a spans the spaced walls of the body beam 29 and serves as a tunnel through which the tubular member 27 extends.

The driven shaft H, which is comprised of the differential section 30, universal joint 25, intermediate section 31, universal joint 32 and outer end section 33 imparts drive to the wheel E. The universal joints, of course, permit the up and down movement of the vehicle body relative to the wheel.

The control arm 16 is of hollow construction including the intermediate portion 35 which terminates with the angularly outwardly directed wheel carrying end portion 36 to which the wheel carrying backing plate 37 is secured. The control arm has a boss portion 39 to which the outer end 40 of the shock absorber is attached. The shock absorber may be of the centrifugal type wherein the crank arm 41 swings about the axis of pin 42 which extends into the hydraulic cylinder 43. The wheel carrying end portion of the control arm is provided with an opening 45 to permit the driven shaft H to pass therethrough.

The inner end of the control arm has a hollow boss 50 formed thereon, including the end trunnion portions 15 and 19 which are rotatably received in the bearing members 14a and 17. The torsion bar 52 may be provided with a hexagonally shaped end 53 to lock it against rotation relative to the arm boss 50. The other end of the bar also has a hexagonally shaped end 55 to lock it against rotation relative to the bearing sleeve 54. A first bearing member 54a is secured in the wall 62 and rotatively carries the bearing sleeve 54. The vehicle body, which includes the upright walls 18 and 26, has a tubular bearing member 57 spanning the area between such walls and providing a housing through which the torsion bar passes.

It will be understood that the vehicle is of the type capable of floating in water and, consequently, has a floor area, the underside of which serves as a hull. The wall members 60 and 61 in conjunction with wall 62 and wall 26 form a pocket area in the hull for accommodating the torsion adjustment device 63. The device is of conventional construction with the hub end 64 anchored to the torsion bar through the medium of bearing sleeve 54 and a conventional adjustment device 65 (not shown in detail) permits rotative adjustment of the torsion bar for raising or lowering the vehicle body with reference to wheel E.

The recessed area 66 is such as to accommodate the length of travel of the control arm in its up and down swinging movement around the axis of torsion bar 52.

I claim:

1. A suspension and drive system for a vehicle comprising: a vehicle body having a floor panel and a beam rigid therewith and extending longitudinally thereof, said body also having a side wall disposed outwardly from the beam; a first bearing member in the beam and extending transversely thereof; a bearing sleeve rotatively received within the first bearing member; a second bearing member in the side wall spaced from and aligned with the first bearing member; an arm having a hollow boss with trunnion portions projecting outwardly on either side thereof, one of such trunnion portions being rotatively mounted in the second bearing member; a bracket having a third bearing member and secured to the vehicle body and having the remaining trunnion portion rotatably mounted therein; a torsion bar extending through a trunnion portion and through the second bearing member and into the bearing sleeve in the first bearing member, said bar having one end non-rotatively received within the bearing sleeve and its other end non-rotatively received within one of the trunnion portions of the arm; a wheel carrying backing plate anchored to the arm at the end remote from the end having the boss with trunnion portions; a wheel rotatively carried on the wheel carrying backing plate; a driven shaft spaced from the torsion bar and extending through the beam into the interior of the vehicle body and being drivingly connected to the wheel; drive mechanism carried on the vehicle body for driving the driven shaft.

2. A suspension and drive system for a vehicle comprising: a vehicle body having a floor panel and a beam rigid therewith and extending longitudinally thereof, said body also having a side wall disposed outwardly from the beam; a first bearing member in the beam and extending transversely thereof; a bearing sleeve rotatively received within the first bearing member; a second bearing member in the side wall spaced from and aligned with the first bearing member; an arm having a hollow boss with trunnion portions projecting outwardly on either side thereof, one of such trunnion portions being rotatably mounted in the second bearing member; a bracket having a third bearing member and secured to the vehicle body and having the remaining trunnion portion rotatably mounted therein; a torsion bar extending through the trunnion portions and through the second bearing sleeve and into the bearing sleeve in the first bearing member, said bar having one end non-rotatively received within the bearing sleeve and its other end non-rotatively received within the remaining trunnion portion of the arm; the end of the arm remote from the end having the boss with trunnion portions having an opening in a side wall thereof; a wheel carrying backing plate anchored to the arm at the end remote from the end having the boss with trunnion portions; a wheel rotatively carried on the wheel carrying backing plate; a driven shaft extending through the arm opening and through the wheel carrying backing plate and being drivingly connected to the wheel, said driven shaft being spaced from the torsion bar and extending through the beam into the interior of the vehicle body; drive mechanism carried on the vehicle body for driving the driven shaft.

3. A suspension and drive system for a vehicle comprising: a vehicle body having a floor panel and a hollow beam rigid therewith and extending longitudinally thereof, said body also having a side wall disposed outwardly from the beam; a first bearing member anchored in the beam and extending transversely thereof; a bearing sleeve rotatively received within the first bearing member; a second bearing member anchored in the side wall and spaced from and aligned with the first bearing member; an arm having a hollow boss with trunnion portions projecting outwardly on either side thereof, one of such trunnion portions being rotatively mounted in the second bearing member; a bracket having a third bearing member and secured to the vehicle body and having the remaining trunnion portion mounted therein; a torsion bar extending through the trunnion portions and through the second bearing member and into the bearing sleeve in the first bearing member, said bar having one end non-rotatively received within the bearing sleeve and its other end non-rotatively received within the remaining trunnion portion of the arm; the end of the arm remote from the end having the boss with trunnion portions being hollow and having registering openings in opposite side walls thereof; a wheel carrying backing plate having an opening therethrough registered with the arm openings and being anchored to the arm at the end remote from the end having the boss with trunnion portions; a wheel rotatively carried on the wheel carrying backing plate; a driven shaft extending through the arm openings and through the wheel carrying backing plate opening and being drivingly connected to the wheel, said driven shaft being spaced from and generally parallel to the torsion bar and extending through the hollow beam into the interior of the vehicle body; drive mechanism carried on the vehicle body for driving the driven shaft.

4. In a suspension system for a vehicle: a vehicle body having a floor panel and a hollow beam rigid therewith and projecting upwardly therefrom and extending longitudinally thereof, said body also having a side wall disposed outwardly from the beam and projecting upwardly from the floor panel to provide a pocket area in the body; a tubular member spanning the pocket above the floor panel and being anchored at its ends to the side wall and to the beam; a first bearing member in the beam and extending transversely thereof; a bearing sleeve rotatively received within the first bearing member; a second bearing member in the side wall spaced from and aligned with the first bearing member and with the tubular member; an arm having a hollow boss with trunnion portions projecting outwardly on either side thereof, one of such trunnion portions being rotatably mounted in the second bearing member; a bracket having a third bearing member and secured to the vehicle body and having the remaining trunnion portion rotatably mounted therein; a torsion bar extending through the trunnion portions and through the second bearing member and through the tubular member and into the bearing sleeve, said bar having one end non-rotatively received within the bearing sleeve and its other end non-rotatively received within the remaining trunnion portion of the arm; a wheel carrying backing plate anchored to the arm at the end remote from the end having the boss with trunnion portions; a wheel rotatively carried on the wheel carrying backing plate and a shock absorbing device connected between the vehicle body and the wheel carrying end of the arm.

5. In a suspension system for a vehicle: a vehicle body having a floor panel and a hollow beam rigid therewith and projecting upwardly therefrom and extending longitudinally thereof, said body also having a side wall disposed outwardly from the beam and projecting upwardly from the floor panel to provide a pocket area in the body; a tubular member spanning the pocket above the floor panel and being anchored at its ends to the side wall and to the beam; a first bearing member in the beam and extending transversely thereof; a bearing sleeve rotatively received within the first bearing member; a second bearing member in the side wall spaced from and aligned with the first bearing member and with the tubular member; an arm having a hollow boss with trunnion portions projecting outwardly on either side thereof, one of such trunnion portions being rotatably mounted in the second bearing member; a bracket having a third bearing member and secured to the vehicle body and having the remaining trunnion portion rotatably mounted therein; a torsion bar extending through the trunnion portions and through the secod bearing member and through the tubular member and into the bearing sleeve, said bar having one end non-rotatively received within the bearing sleeve and its other end non-rotatively received within the remaining trunnion portion of the arm; a wheel carrying backing plate anchored to the arm at the end remote from the end having the boss with trunnion portions; a wheel rotatively carried on the wheel carrying backing plate and a shock absorbing device connected between the vehicle body and the wheel carrying end of the arm; said floor panel having an opening therein and forming in conjunction with the hollow beam a second pocket area; means in the second pocket area and anchored to the beam and having connection to the torsion bar for rotating same to adjust the height of the vehicle body relative to the wheel.

6. In a suspension system for a vehicle: a vehicle body having a floor panel and a hollow beam rigid therewith and projecting upwardly therefrom and extending longitudinally thereof; said body also having a side wall disposed outwardly from the beam and projecting upwardly from the floor panel to provide a pocket area in the body; aligned bearing members in the beam and side wall; an arm having one end rotatively carried by some of the bearing members; a wheel carrying backing plate anchored to the arm at the end remote from the end carried by the bearing members; a wheel rotatively carried on the wheel carrying backing plate; a torsion bar extending through the side wall and through the beam and having one of its ends non-rotatively connected to the arm and its other end rotatively supported by one of the bearing members in the beam; said floor panel having an opening therein and forming in conjunction with the hollow beam a second pocket area; means in the second pocket area and having connection to the torsion bar for rotating same to adjust the height of the vehicle body relative to the wheel; a driven shaft spaced from the torsion bar and extending through the beam into the interior of the vehicle body and being drivingly connected to the wheel; drive mechanism carried on the vehicle body for driving the driven shaft.

References Cited in the file of this patent

UNITED STATES PATENTS

| | | |
|---|---|---|
| 2,049,474 | Smith | Aug. 4, 1936 |

FOREIGN PATENTS

| | | |
|---|---|---|
| 192,774 | Austria | Nov. 11, 1957 |